United States Patent
Chowdhary et al.

(10) Patent No.: US 9,131,344 B2
(45) Date of Patent: Sep. 8, 2015

(54) METHOD AND DEVICE FOR AUTOMATIC CREATION OF A LOCATION-BASED TALK GROUP CALL WITH REDUCED MESSAGING OVERHEAD

(75) Inventors: Dipendra M. Chowdhary, Hoffman Estates, IL (US); Thomas B. Bohn, McHenry, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 330 days.

(21) Appl. No.: 13/590,318

(22) Filed: Aug. 21, 2012

(65) Prior Publication Data

US 2014/0057645 A1 Feb. 27, 2014

(51) Int. Cl.
| | |
|---|---|
| H04W 24/00 | (2009.01) |
| H04W 4/02 | (2009.01) |
| H04W 4/08 | (2009.01) |
| H04W 76/00 | (2009.01) |
| H04W 84/08 | (2009.01) |
| H04L 29/06 | (2006.01) |

(52) U.S. Cl.
CPC .............. *H04W 4/021* (2013.01); *H04W 4/08* (2013.01); *H04L 69/22* (2013.01); *H04W 76/002* (2013.01); *H04W 84/08* (2013.01)

(58) Field of Classification Search
USPC ............................ 455/456.2, 519, 518, 416
See application file for complete search history.

(56) References Cited

U.S. PATENT DOCUMENTS

| | | | |
|---|---|---|---|
| 5,511,232 A | 4/1996 | O'Dea et al. | |
| 5,613,209 A | 3/1997 | Peterson et al. | |
| 6,484,037 B1 * | 11/2002 | Schmidt et al. | 455/514 |
| 6,516,200 B1 * | 2/2003 | Schmidt et al. | 455/518 |
| 7,184,790 B2 | 2/2007 | Dorenbosch et al. | |
| 8,103,300 B2 | 1/2012 | Gogic | |
| 8,427,996 B2 * | 4/2013 | Woodward et al. | 370/312 |
| 2005/0037794 A1 * | 2/2005 | Namm et al. | 455/519 |
| 2005/0222933 A1 * | 10/2005 | Wesby | 705/36 |
| 2007/0225004 A1 | 9/2007 | Tang et al. | |
| 2008/0250025 A1 | 10/2008 | Abhyanker | |
| 2009/0054098 A1 | 2/2009 | Jorgensen | |
| 2011/0177829 A1 * | 7/2011 | Platt et al. | 455/456.2 |
| 2013/0021965 A1 * | 1/2013 | Chu et al. | 370/328 |
| 2013/0157634 A1 * | 6/2013 | McDonald et al. | 455/416 |

FOREIGN PATENT DOCUMENTS

WO 0028347 A1 5/2000

OTHER PUBLICATIONS

"Electromagnetic compatibility and Radio spectrum Matters (ERM); Digital Mobile Radio (DMR) Systems; Part 1: DMR Air Interface (AI) protocol," ETSI TS 102 361-1 V2.1.1, Apr. 2012.

* cited by examiner

*Primary Examiner* — David Q Nguyen
(74) *Attorney, Agent, or Firm* — Barbara R. Doutre (57) ABSTRACT

Disclosed is a method of automatic establishment of a location-based talk group call with reduced messaging overhead. The initiating device may be a subscriber unit (SU). The SU determines a geographic reference location and generates location data representative of the location. The SU broadcasts a location-based talk group call header including the location data and including a location-based talk group call identifier field set to cause other SUs receiving the call header to receive and output subsequent data associated with the call header responsive to determining that its current geographic location satisfies the location criterion of the call. The location criterion may be fully determined by the initiating SU and specified in the call header, and may take the form of a specified radius that extends from the geographic reference location represented in the call header.

12 Claims, 7 Drawing Sheets

METHOD AND DEVICE FOR AUTOMATIC CREATION OF A LOCATION-BASED TALK GROUP CALL WITH REDUCED MESSAGING OVERHEAD

FIELD OF THE DISCLOSURE

The present disclosure relates to digital radio communication systems, in general, and to automatic creation of location-based talk group calls with reduced messaging overhead, in particular.

BACKGROUND OF THE DISCLOSURE

Radio access networks (RANs) provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, eNodeB, repeater, and/or access point. Such a RAN typically includes a system infrastructure which generally includes a network of various fixed terminals, which are in direct radio communication with the subscriber units. Each of the fixed terminals operating in the RAN may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the RAN are made via respective serving fixed terminals. Sites of neighbouring fixed terminals may be offset from one another or may be non-overlapping or partially or fully overlapping.

RANs may operate according to an industry standard protocol such as, for example, the Project 25 (P25) standard defined by the Association of Public Safety Communications Officials International (APCO), or other radio protocols, such as the terrestrial trunked radio (TETRA) standard defined by the European Telecommunication Standards Institute (ETSI) or the Digital Mobile Radio (DMR) standard also defined by the ETSI. Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in RANs such as those set forth above send user communicated speech and data, herein referred to collectively as 'traffic information', in accordance with the designated protocol.

Many so-called 'public safety' RANs provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force group.

When an event or incident occurs, such as a fire or accident, numerous different groups may respond to the incident, including for example, direct first responders such as police, fire, and medical groups and supporting responders such as utility, traffic control, crowd control groups, among others.

In some examples, a dispatcher at a dispatch console disposed in the RAN may control operation of the subscriber units arriving at the incident scene, and may instruct each subscriber unit or group of subscriber units to manually join one or more groups particularly associated with the incident so that all subscriber units responding to the incident can communicate with one another about the incident. For example, verbal or text messages may be broadcast from the dispatch console to all subscriber units in a police group, a fire group, and a medical group. In emergency situations, e.g. in case of an accident, however, it takes a significant amount of time for the dispatcher to manually create one or more talk groups, identify subscriber units and/or groups responding to the emergency situation, and to correspondingly assign the groups, as well as to monitor and assign subsequently arriving subscriber units to those groups. Such manual processes causes some delay as additional exchanges of information is required and causes some additional delay as a result of required manual operations of varying dispatch console operators, among other issues.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

In light of the foregoing, there is a need for a method of automatic creation of location-based talk group calls with reduced messaging overhead and manual dispatcher involvement, and for a mobile subscriber unit to process and selectively join such location-based talk group calls, which alleviate or overcome the disadvantages of the prior art.

According to a first embodiment of the present disclosure, disclosed is a method of automatic establishment of a location-based talk group call with reduced messaging overhead. The initiating device may be a subscriber unit (SU). The SU determines a geographic reference location and generates location data representative of the location. The SU broadcasts a location-based talk group call header including the location data and including a location-based talk group call identifier field set to cause other SUs receiving the call header to receive and output subsequent data associated with the call header responsive to determining that its current geographic location satisfies the location criterion of the call. The location criterion may be fully determined by the initiating SU and specified in the call header, and may take the form of a specified radius that extends from the geographic reference location represented in the call header.

According to a second embodiment of the present disclosure, disclosed is a wireless subscriber unit comprising a memory, a transceiver, and a processor. the processor is configured to receive, via the transceiver, a first location-based talk group call header including location data and including a location-based talk group call identifier field set to a value, to determine a current geographic location of the wireless subscriber unit, to determine whether the current geographic location satisfies the location criterion of the call that is at least partly defined by the location data included in the call header, and if it is determined that the current geographic location does satisfy the location criterion of the call, to process and output subsequent data, received via the transceiver, associated with the call header.

According to a third embodiment of the present disclosure, disclosed is a method of automatic establishment of a location-based talk group call with reduced messaging overhead. The initiating device may be also be a dispatch console (DC). The DC determines a geographic reference location and generates location data representative of the location. The DC identifies one or more base stations determined to provide coverage within a predefined distance from the reference geographic location. The DC then generates a location-based talk group call header including the location data and including a location-based talk group call identifier field set to a value that causes subscriber units receiving the call header to receive and output subsequent data associated with the call header responsive to each of the subscriber units determining that its current geographic location satisfies the location criterion of the call that is at least partly defined by the location data included in the call header. Subsequently, the DC causes the location-based talk group header to be broadcast via the identified base stations.

Each of the above-mentioned embodiments will be discussed in more detail below, starting with example network and device architectures of the system in which the embodiments may be practiced, followed by a discussion of automatic creation of location-based talk group calls from the point of view of the subscriber unit and then of the dispatch console. Further advantages and features consistent with this disclosure will be set forth in the following detailed description, with reference to the figures.

I. NETWORK AND DEVICE ARCHITECTURES

Figure 1:
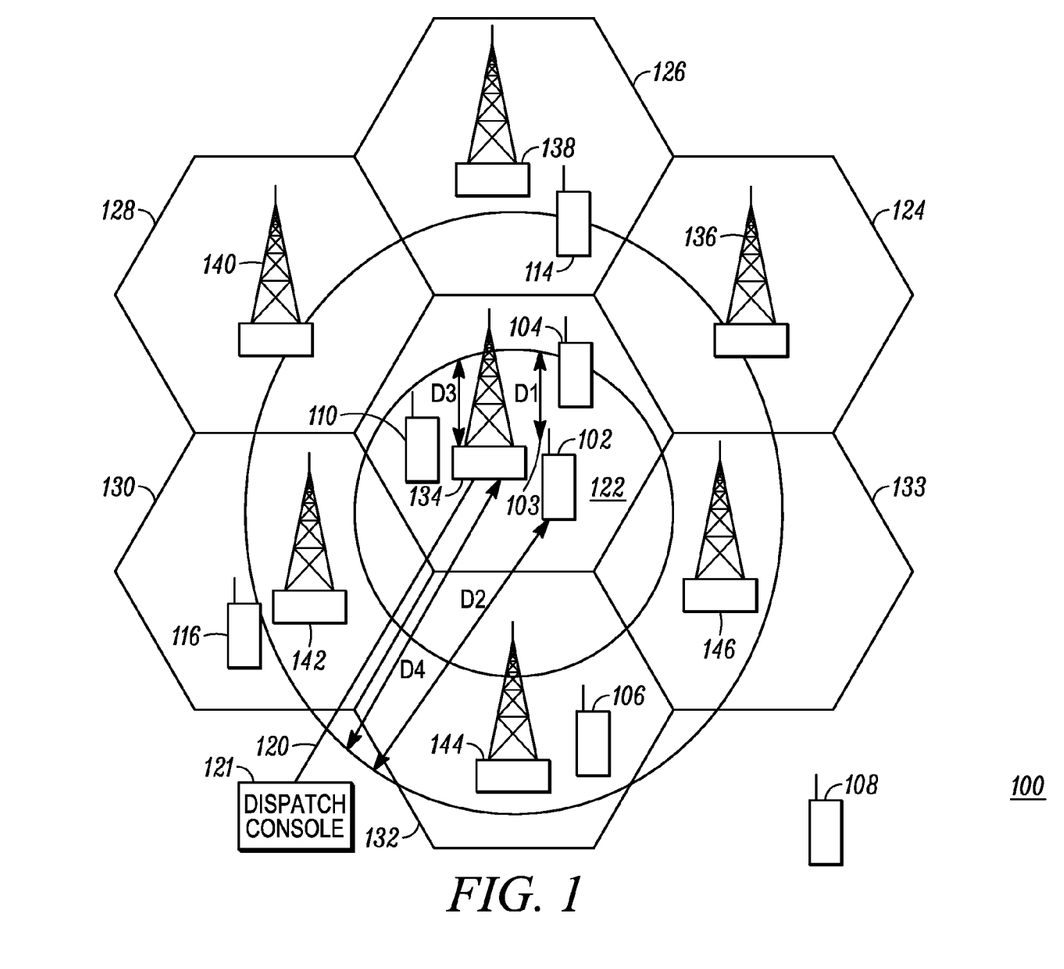
FIG. 1 is a schematic illustration of a communication system operating in accordance with an embodiment.

Referring to FIG. 1, one embodiment of a wireless communication system 100 according to the present disclosure is shown. It will be apparent to those skilled in the art that the system 100 and the components which are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 includes one or more fixed terminals (e.g., base stations/eNodeBs/repeaters/control terminals) (BSs) 134-146, each of which may be operably connected to a system infrastructure (not shown) via respective wired or wireless links, and each having a corresponding coverage area 122-133 over which wireless communication services are respectively provided. While the term BS will be used to refer to the fixed terminals 134-146, for ease of reference, it should be noted that the fixed terminals 134-146 may, in some embodiments, be a repeater, an eNodeB, or a control terminal, or some other type of fixed terminal. Each BS 134-146 may have radio links with a plurality of subscriber units, particularly subscriber units (SUs) in a service cell or site at least partially defined by a geographic location of the BS. In addition to SUs, each BS may maintain a direct wireless or wired link with a dispatch console or other operator. For example, BS 134 is illustrated as being communicatively coupled to a dispatch console (DC) 121 via wired link 120. The DC 121 may be configured to act as a communications client of BS 134.

A plurality of SUs 102-116 is illustrated in FIG. 1 as operating within the wireless communication system 100. For example, SUs 102, 104, and 110 are within the service area 122 of, and has selected to communicate with, BS 134 via respective radio links (not shown), SU 114 is within the service area 126 of, and has selected to communicate with, BS 138 via respective radio links (not shown), SU 116 is within the service area 130 of, and has selected to communicate with, BS 142 via respective radio links (not shown), SU 106 is within the service area 132 of, and has selected to communicate with, BS 144 via respective radio links (not shown), and SU 108 is illustrated as being outside a service area of any BSs in the wireless communication system 100.

In one embodiment, each BS serves SUs within its service area with radio communications to and from other terminals, the other terminals including (i) SUs served by the same BS, (ii) SUs served by other BSs, (iii) other terminals including SUs in other systems (not shown) operably linked to the system 100 via the system infrastructure (not shown), and (iv) a DC.

In another embodiment in which SUs 102-116 are operating in a direct communication mode (DCM), e.g., without the aid of infrastructure or BSs, direct mode radio links (not shown) may be used to transmit direct mode communications between the SUs.

A system infrastructure supporting each BS may include known sub-systems (not shown) required for operation of the system 100. Such sub-systems may include, for example, sub-systems providing authentication, routing, SU registration and location, system management and other operational functions within the system 100. The system infrastructure may additionally provide routes to other BSs (not shown) providing cells serving other SUs, and/or may provide access to other types of networks such as a plain old telephone system (POTS) network or a data-switched network such as the Internet.

For the purpose of illustrating methods and apparatus for automatic creation of location-based talk group calls with reduced messaging overhead in later sections of this disclosure, FIG. 1 illustrates a first distance D1 and a second distance D2, both measured from a geographic reference location that could be the location of the SU 102 or an incident scene 103, and a third distance D3 and a fourth distance D4, both measured from a geographic reference location that could be the location of the BS 134 or the incident scene 103. In different embodiments, distances D1-D4 may represent a specified distance parameter for creating a location-based talk group call relative to geographic reference locations SU 102 (D1, D2), and BS 134 or incident scene 103 (D3, D4).

Figure 2:
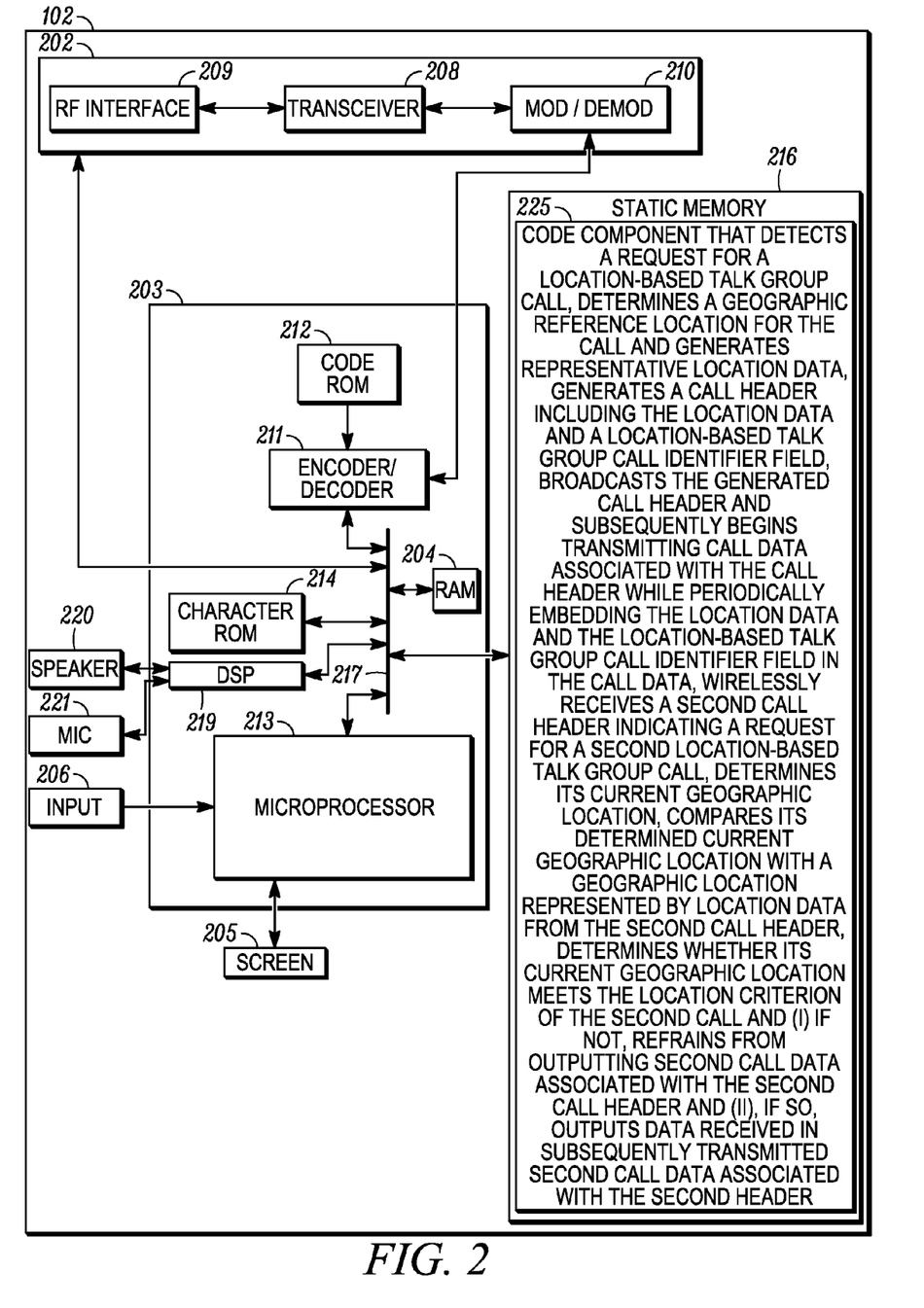
FIG. 2 is a block diagram of subscriber unit capable of operating in the communication system of FIG. 1 in accordance with an embodiment.

FIG. 2 is an example functional block diagram of a SU such as SU 102 operating within the system 100 of FIG. 1 in accordance with some embodiments. Other SUs such as SUs 104-116 may contain same or similar structures. As shown in FIG. 2, SU 102 includes a communications unit 202 coupled to a common data and address bus 217 of a processing unit 203. The SU 102 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals that may be transmitted or received between other BSs or SUs in the same radio site as SU 102, or perhaps between other BSs in a remote radio site. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include an RF interface 209 configurable to communicate directly with other SUs such as SUs 104-116 and/or with BSs such as BSs 134-146. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding and/or encoding data such as control channel messages and/or data or voice messages that may be transmitted or received by the SU 102. Static memory 216 may store operating code for the microprocessor 213 that, when executed, detects a request for a location-based talk group call, determines a geographic reference location for the call and generates representative location data, generates a call header including the location data and a location-based talk group call identifier field, broadcasts the generated call header and subsequently begins transmitting call data associated with the call header while periodically embedding the location data and the location-based talk group call identifier field in the call data, wirelessly receives a second call header indicating a request for a second location-based talk group call, determines its current geographic location, compares its determined current geographic location with a geographic location represented by location data from the second call header, determines whether its current geographic location meets the location criterion of the second call and (i) if not, refrains from outputting second call data associated with the second call header and (ii), if so, outputs data received in subsequently transmitted second call data associated with the second header, in accordance with one or more of FIGS. 4-6 and corresponding text. Static memory 216 may comprise, for example, a hard-disk drive (HDD), an optical disk drives such as a compact disk (CD) drive or digital versatile disk (DVD) drive, a solid state drive (SSD), a flash memory drive, or a tape drive, to name a few.

Figure 3:
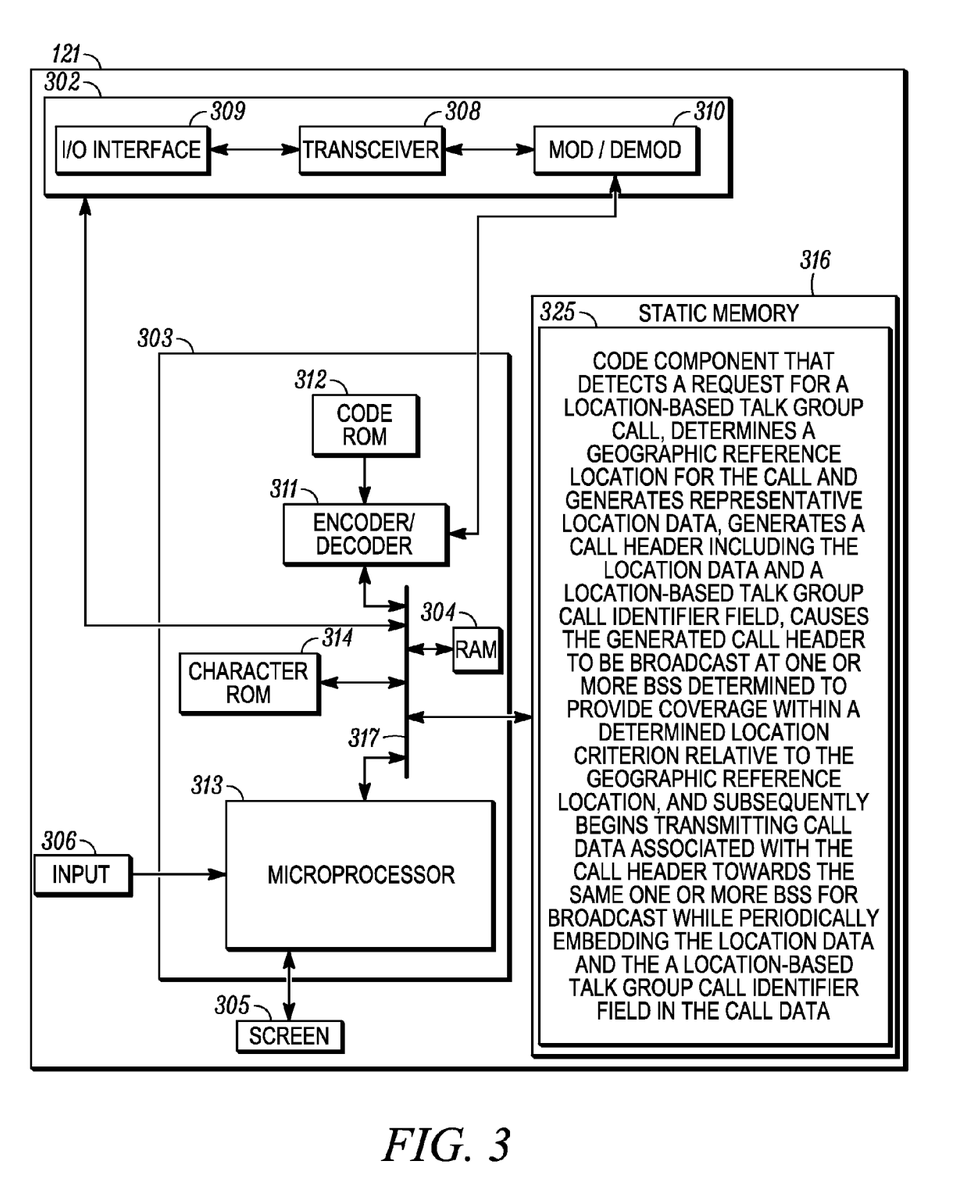
FIG. 3 is a block diagram of a dispatch console computing device capable of operating in the communication system of FIG. 1 in accordance with an embodiment.

FIG. 3 is an example functional block diagram of a DC such as DC 121 operating within the system 100 of FIG. 1 in accordance with some embodiments. Other DCs (not illustrated) in the system 100 may contain same or similar structures. As shown in FIG. 3, DC 121 includes a communications unit 302 coupled to a common data and address bus 317 of a processing unit 303. The DC 121 may also include an input unit (e.g., keypad, pointing device, etc.) 306 and a display screen 305, each coupled to be in communication with the processing unit 303.

The processing unit 303 may include an encoder/decoder 311 with an associated code ROM 312 for storing data for encoding and decoding voice, data, control, or other signals that may be transmitted or received between other BSs or SUs in the system 100. The processing unit 303 may further include a microprocessor 313 coupled, by the common data and address bus 317, to the encoder/decoder 311, a character ROM 314, a RAM 304, and a static memory 316.

The communications unit 302 may include one or more wired or wireless input/output (I/O) interfaces 309 that are configurable to communicate with SUs such as SUs 102-116, with BSs such as BSs 134-146, with the system infrastructure, and/or with other DCs (not shown). The communications unit 302 may include one or more wireless transceivers 308, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control channel messages and/or data or voice messages that may be transmitted or received by the DC 121. Static memory 316 may store operating code for the microprocessor 313 that, when executed, detects a request for a location-based talk group call, determines a geographic reference location for the call and generates representative location data, generates a call header including the location data and a location-based talk group call identifier field, causes the generated call header to be broadcast at one or more BSs determined to provide coverage within a determined location criterion relative to the geographic reference location, and subsequently begins transmitting call data associated with the call header towards the same one or more BSs for broadcast while periodically embedding the location data and the a location-based talk group call identifier field in the call data, in accordance with one or more of FIGS. 5 and 7 and corresponding text. Static memory 316 may comprise, for example, a HDD, an optical disk drives such as a CD drive or DVD drive, a SSD, a tape drive, a flash memory drive, or a tape drive, to name a few.

II. AUTOMATIC CREATION OF LOCATION-BASED TALK GROUP CALL PROCESS FLOWS

Figure 4:
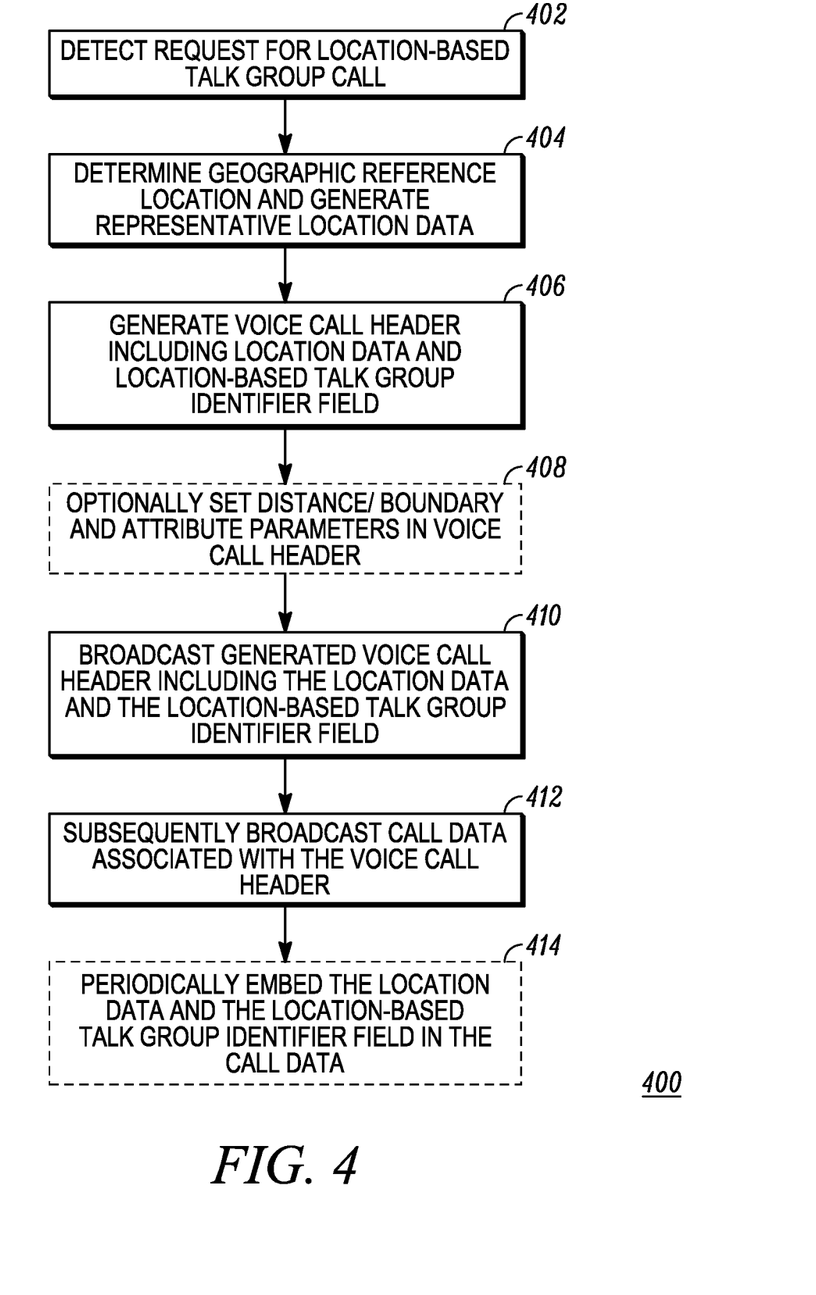
FIG. 4 is a flow chart illustrating a method of automatic creation of a location-based talk group call from the perspective of an initiating subscriber unit in accordance with an embodiment.
Figure 6:
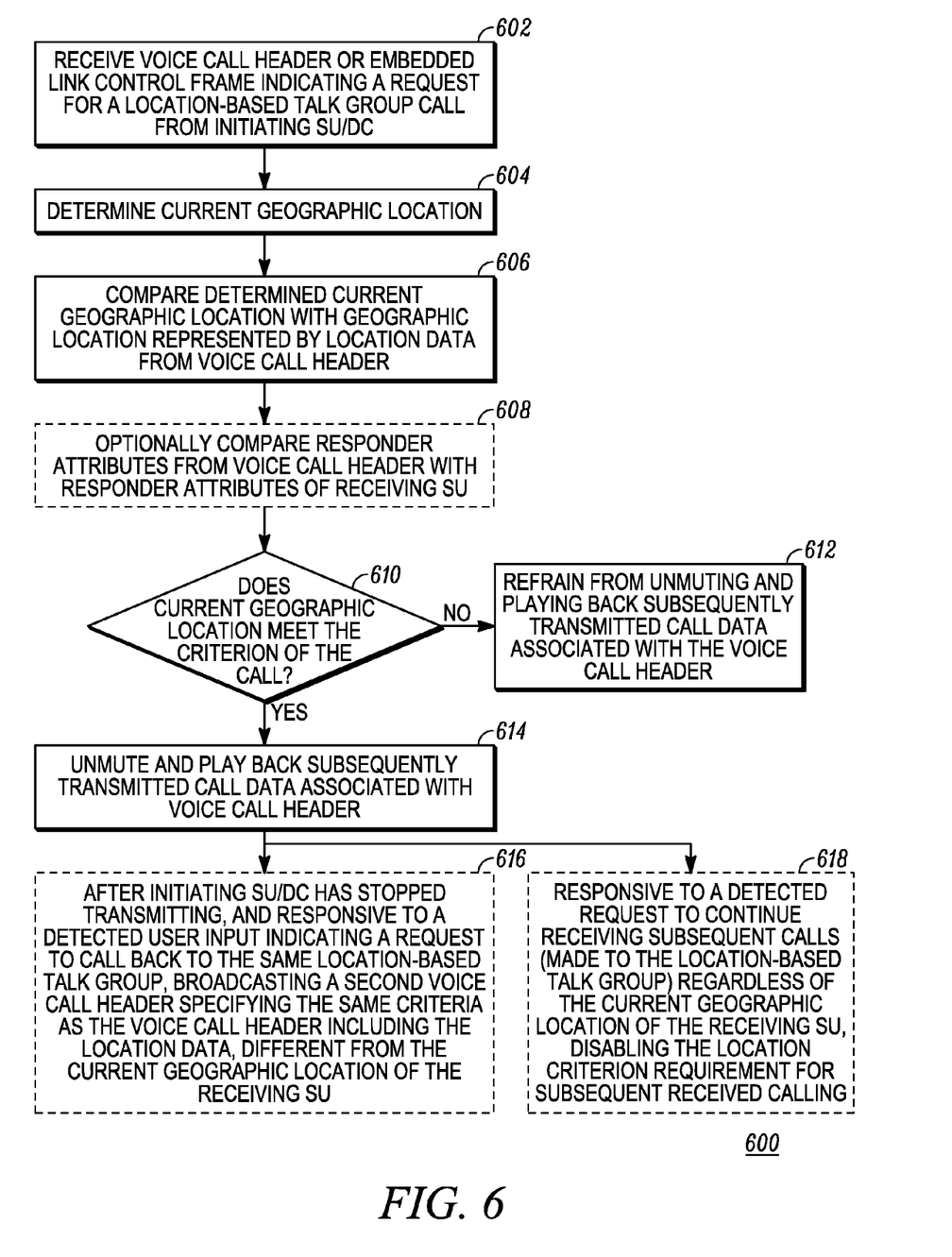
FIG. 6 is a flow chart illustrating a method of automatic creation of a location-based talk group call from the perspective of a receiving subscriber unit in accordance with an embodiment.
Figure 7:
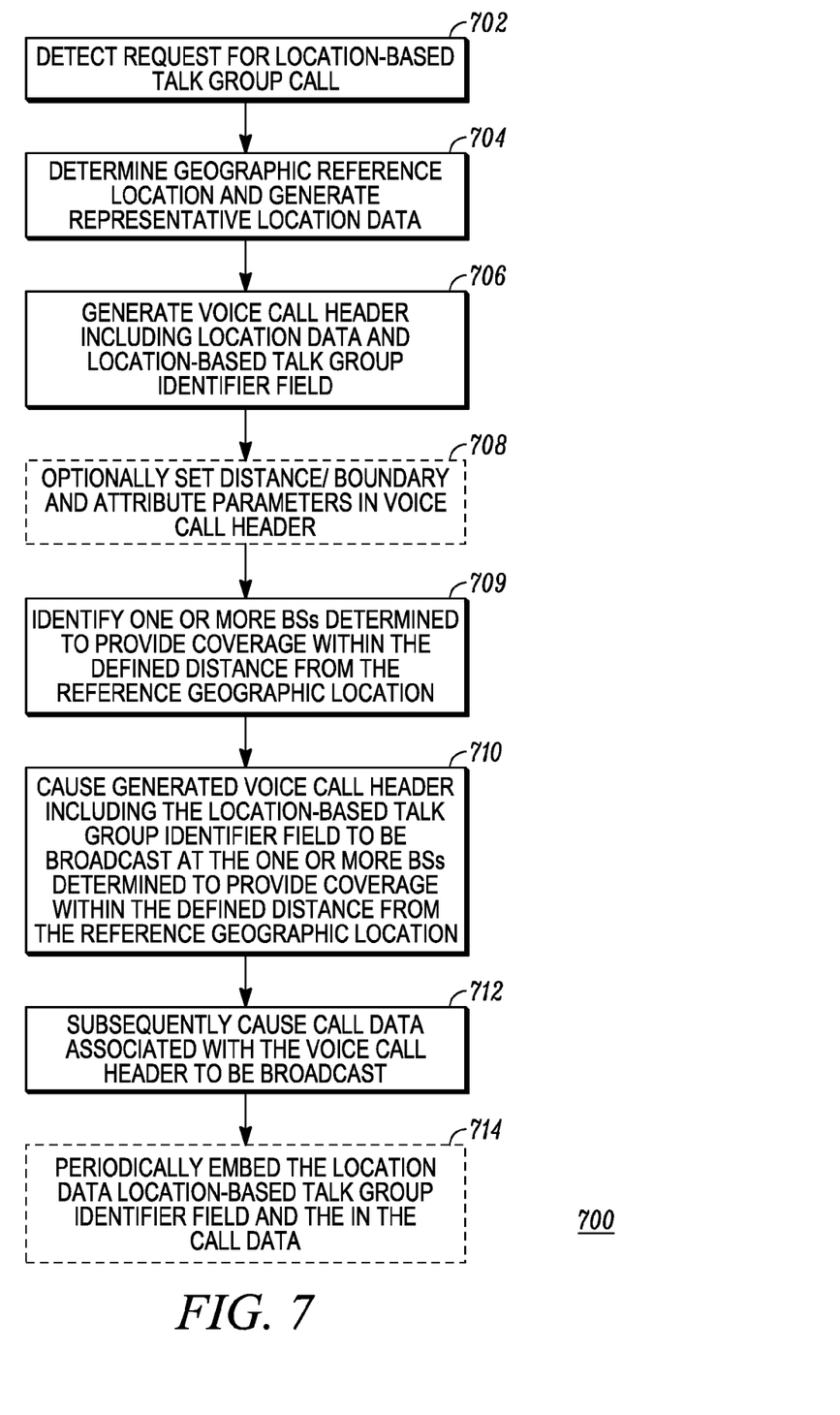
FIG. 7 is a flow chart illustrating a method of automatic creation of a location-based talk group from the perspective of an initiating dispatch console in accordance with an embodiment.

FIGS. 4, 6, and 7 set forth example flows of an automatic location-based talk group call creation process that may be executed at a DC and at a SU in accordance with some embodiments. In the examples set forth in detail below, only particular sequences are disclosed with respect to the SU (FIGS. 4 and 6) and the DC (FIG. 7). Of course, additional steps not disclosed herein could be additionally added before, after, or in-between steps disclosed in FIGS. 4, 6, and 7, and the presence of such additional steps would not negate the purpose and advantages of the examples set forth in detail throughout the remainder of this disclosure. Steps drawn with a dashed outline in FIGS. 4, 6, and 7 should be understood to be optional steps. Further details regarding the process flows will be first set forth with regard to the SU in FIGS. 4 and 6, and then with the DC in FIG. 7, below.

FIG. 4 sets forth a method 400 executable at an initiating SU, such as SU 102 of FIG. 1, for automatically creating and participating in a location-based talk group call with reduced messaging overhead, in accordance with an embodiment. At step 402, the initiating SU detects a request for a location-based talk group call. The initiating SU may detect the request via a detected depression of a push to talk (PTT) button on the SU (e.g., the input 206 in FIG. 2), a selection of a "Talk Group with Neighbouring Radios" menu selection displayed on a display (e.g., the display 205 of FIG. 2) of the SU, or some similar menu option via a same or different input button, or in some other manner. In other embodiments, the initiating SU detecting the request may comprise the SU receiving a request or instruction from an infrastructure device (such as DC 121 of FIG. 1) instructing the SU to start a location-based talk group call. At step 404, and responsive to detecting the request for the location-based talk group call, the initiating SU determines a geographic reference location to use for the location-based call, and generates corresponding representative location data. The geographic reference location may be the determined current geographic location of the SU (e.g., SU 102 in FIG. 1), determined perhaps via a GPS device coupled to the initiating SU or via a triangulation process with one or more fixed network equipment (such as two or more of the BSs 134-146 of FIG. 1), or via some other process. In another embodiment, the geographic reference location may be chosen as a geographic location of a nearest BS (e.g., perhaps a BS 134 in FIG. 1 with the strongest measured signal level at SU 102) provided to the initiating SU by that BS. In still another embodiment, the geographic reference location may be an incident scene selected from a mapping application or database stored locally at the initiating SU or stored remotely from the initiating SU but accessible to the initiating SU via a wireless or wired interface (e.g., incident scene 103 in FIG. 1). In a further embodiment, the geographic reference location may be provided by an infrastructure device, such as the DC 121 of FIG. 1, in a separate message or perhaps in a same message in an embodiment in which the infrastructure device also instructs the SU to request the location-based talk group call. In still a further embodiment, the initiating SU may determine or be provided with an arithmetic mean or geometric mean of locations of a target group of SUs (identified by the SU or an infrastructure device, and perhaps including one or more groups identified via one or more respective group identifiers), perhaps modified by a determined current moment trajectory of the target group. Other methods of determining a geographic reference location could be used as well.

The geographic reference location may be represented via an absolute latitudinal and longitudinal coordinate pair. In other embodiments, Cartesian or polar coordinate systems could be used instead or in addition. Because the geographic reference location will be transmitted over-the-air and used as a pseudo-talk-group identifier, the location data representing the geographic reference location may have to be compressed or concatenated. Location data may be compressed or concatenated in a number of ways, including using relative latitudinal and longitudinal coordinate pairs (e.g., perhaps relative to a nearest BS location or some other agreed upon predetermined fixed location(s), see U.S. application Ser. No. 13/195,611, entitled "Method and System for compressing Location Data of a Radio for Over-The-Air Transmission," filed at the USPTO on Aug. 1, 2011, the entire contents of which are incorporated herein by reference) instead of absolute locations, removing one or more most-significant-bits (MSBs) of the location data (since location-based talk group calls will generally be limited to a transmission range of the initiating SU and/or BS, a pre-determined or dynamically determined number of MSBs of the location data can generally be removed without impacting the resolution of the location data), removing one or more least-significant-bits (LSBs) of the location data (e.g., in situations where lower resolution may be sufficient), or using more traditional data compression techniques such as run length encoding (RLE). Other possibilities exist as well.

At step 406, the initiating SU generates a voice call header including the representative location data and a location-based talk group call identifier field. In other embodiments, the header may be a multimedia call header, a video call header, a text message header, a control header, a signalling header, or some other type of call header (and, e.g., is followed subsequently by corresponding multimedia data, video data, text message data, control data, signalling data, etc.). At optional step 408, the initiating SU may also determine a location criterion relative to the geographic reference location that the location-based group call should require that responding receiving SUs meet before joining the talk group call. For example, the initiating SU may be previously configured, or configured by a user on a call-by-call basis, to set a distance-based location criterion, relative to the geographic reference location, of 0.5 miles, 1 mile, 2 miles, or 5 miles. The distance location criterion may then be included within the voice call header and used by receiving SUs in determining whether to join the talk group call and output subsequently received call data associated with the call header (e.g., voice via an unmuted speaker for a voice call header—an example used in the remainder of this disclosure, but additionally or alternatively including video via a display for a video data header, text via a display for a text message header, control or signalling via a processor for further processing, etc.). In other embodiments, the initiating SU may not include a location criterion in the voice call header, and instead may rely on some preconfigured location criterion, such as a distance value(s) set in the receiving SUs, for the receiving SUs to determine whether they are sufficiently close to the geographic reference location to join the talk group call. Of course, other methods of defining location criteria than specifying distance may be used, including specifying geographic boundaries (e.g., west of latitude 46', north of longitude 35') or specifying street boundaries (e.g., north of the Eisenhower expressway, west of the Kennedy expressway), etc.

Also at optional step 408, the initiating SU may define one or more attributes that function to further limit the field of receiving SUs receiving the voice call header and joining the talk group call. For example, the attribute field may specify that only receiving SUs associated with police response, with fire response, with medical response, and/or more generically configured with an attribute value of "1", that also meet the location criterion of the call, should join the talk group call and unmute for subsequently received call audio associated with the voice call header. A predetermined "don't care" value (such as all "0"s) may be populated into the attribute field to indicate that all receiving SUs meeting the location criterion of the new talk group call should unmute for the call.

Figure 5:
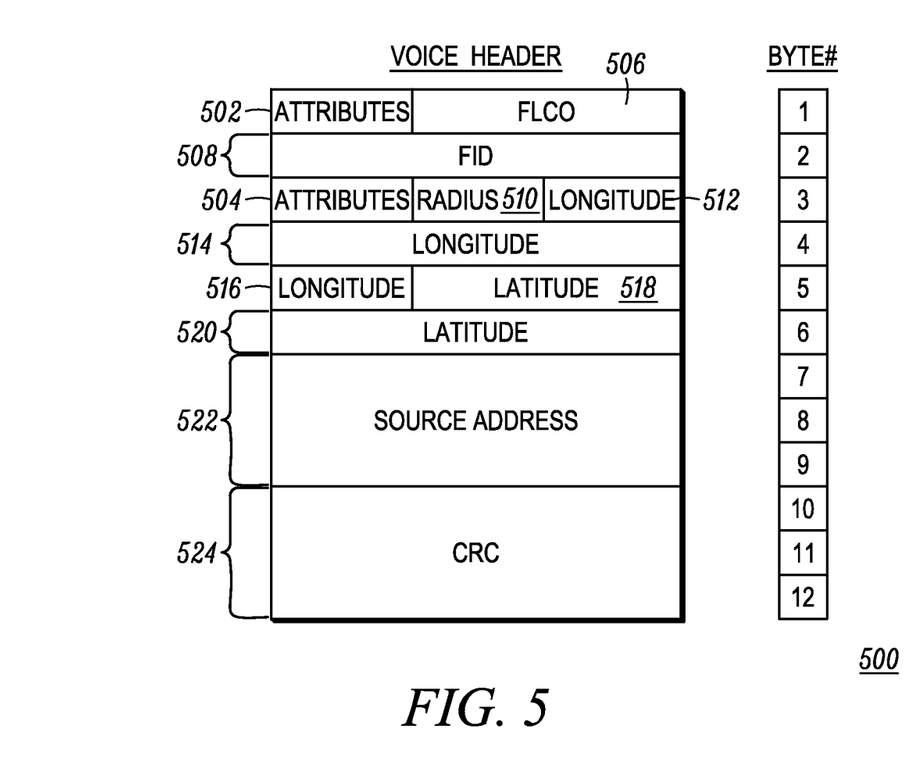
FIG. 5 is a block diagram illustrating an example voice call header that may be transmitted to start a location-based talk group call in accordance with an embodiment.

An example voice call header 500 consistent with the present disclosure is set forth in FIG. 5. While the size and structure of the voice call header 500 is illustrated consistent with the constraints of the DMR (ETSI-DMR Part 1 TS 102 361-1 V2.1.1, April 2012) protocol standard, same or similar voice call headers or other types of headers using same or similar fields could be used in other standard and non-standard talk group call protocols.

Attribute fields 502 and 504 of voice call header 500 are split across bytes 1 and 3, and provide signalling space for the initiating SU to further limit the field of responding receiving SUs consistent with step 408 of FIG. 4, discussed earlier. The full link control opcode (FLCO) field 506 specifies the type of call being started, and in this example, may be set to a value to indicate that it is a location-based talk group call (e.g., "Loc_Grp_V_Ch_Usr"), and thus field 506 may function as a location-based talk group call identifier field. Accordingly, the FLCO field 506 may be used by a receiving device to determine whether other fields in the voice call header 500 should be treated as a conventional talk group ID (e.g., when the opcode indicates that it is a conventional talk group call) or as a location-based talk group ID (e.g., when the opcode indicates that it is a location-based talk group call), and thus may trigger different processing of the voice call header 500 at the receiving SU(s). The manufacturer's feature set ID (FID) field 508 may be set to a value to indicate a particular manufacturer feature set (such as "Motorola Solutions").

An optional radius field 510 may be used by a transmitting radio to specify a location criterion relative to the geographic reference location (that is also specified in the voice call header 500). As one example, the radius field 510 may be populated with a value to indicate how many miles from the geographic reference location an outer boundary should be established such that only receiving SUs within the boundary join the location-based talk group call and unmute for subsequently received call data associated with the voice call header, while receiving SUs determined to be outside the boundary refrain from joining the location-based talk group call and refrain from unmuting for subsequently received call data associated with the voice call header. For a two-bit radius field, a value of "00" may indicate 0.5 miles, a value of "01" 1 mile, a value of "10" 2 miles, and a value of "11" 5 miles. Other mappings between values and distance are possible as well. As set forth earlier, instead of a radius or distance field, other types of location criterion could be included in the voice call header 500 to limit the number of receiving radios joining the talk group call.

In one example, and with reference to FIG. 1, a transmitting SU such as SU 102 may set a distance D1 equal to 1 mile (thus implicating receiving SUs 104 and 110, but not SUs 106, 108, 114, or 116, even though they may still receive the voice call header), or may set a distance D2 equal to 2 miles (thus implicating receiving SUs 104, 106, 110, and 114 but not SUs 108 or 116), relative to a geographic reference location also represented in the voice call header that could be associated with the SU's 102 location, an incident scene location 103, or a location of the nearby BS 134, among other possibilities.

Longitude fields 512, 514, and 516 contain portions of a longitude coordinate of the geographic reference location (and may be concatenated in some preconfigured order). In some embodiments, a receiving SU may use the longitude values straight from the longitude fields 512-516, while in other embodiments, a receiving SU may have to further process the longitude values from longitude fields 512-516 before it can use the information in determining whether to join a talk group call. For example, a receiving SU may have to uncompress the longitude information retrieved from the fields 512-516 using a reverse function of that implemented at the initiating SU or BS, concatenate the longitude information retrieved from the fields 512-516 with one or more MSBs or LSBs of its own determined longitude, concatenate the longitude information retrieved from the fields 512-516 with portions of longitude information of a nearby BS (e.g., perhaps using the method as set forth in U.S. application Ser. No. 13/195,611, entitled "Method and System for compressing Location Data of a Radio for Over-The-Air Transmission," filed at the USPTO on Aug. 1, 2011), or perform some other decompression or concatenation process.

Latitude fields 518 and 520 contain portions of a latitude coordinate of the geographic reference location (and may be concatenated in some predetermined order). In some embodiments, a receiving SU may use the latitude values straight from the latitude fields, while in other embodiments, a receiving SU may have to further process the latitude values from latitude fields 518-520, in a similar manner to that set forth above with respect to the longitude values, before it can use the latitude information in determining whether to join a talk group call.

In accordance with the ETSI-DMR Part 1 TS 102 361-2 V2.1.1, April, 2012 standard, bytes 4-6 of the voice call header 500 may occur in a same location as a 3-byte destination talk group identifier in a conventional (e.g., preconfigured and non-location-based) destination group identifier used to establish group calls. Accordingly, and in this example, the same 3-bytes (and perhaps including additional information in other parts of the voice call header 500 such as additional longitude field 512 in the third byte) may be used by an initiating SU or DC to dynamically establish a location-based talk group identifier based on the determined geographic reference location that can be stored by a receiving SU and, accordingly, accessed and used again by any receiving SU in the future to again contact SUs using the same location data (e.g., as a pseudo-talk group identifier) as the initiating SU. Of course, due to the passage of time and the inherent mobility of SUs, the particular SUs responding to a subsequent new call to the same location based talk group ID may be different than the SUs that participated in the initial group call.

The source address field 522 may be used by the initiating BS or DC to identify the network address or hardware address of the source transmitter. The cyclic redundancy check (CRC) field 524 may be used to set forth a CRC value used for verifying, by the receiving SU, that the message has been received in an error-free state.

Returning to FIG. 4, at step 410, the initiating SU broadcasts the generated voice-call header, including the location data, the location-based talk group call identifier field, and any other fields generated at steps 406 and/or 408. At step 412, and without having to wait for SUs receiving the voice call header to affirmatively respond and join the new and dynamically created location-based talk group call, the initiating SU subsequently begins to broadcast call data associated with the voice call header. Accordingly, the initiating SU leaves it up to receiving SUs to determine whether to unmute for the subsequently transmitted call data, and does not arbitrate or otherwise affirmatively accept or reject receiving SU participation in the location-based talk group call (for example, IDs and location information of receiving SUs are not provided or transmitted to the initiating SU in relation to the location-based talk group call), resulting in decreased messaging overhead in creating location-based talk group calls, improved start-up times in creating location-based talk group calls, and less chance for errors due to manual dispatcher configuring.

At optional step 414, the initiating SU may also periodically embed the location data and a same or similar location-based talk group call identifier field in an embedded link control frame embedded within the call data to allow late-arriving SUs that perhaps missed the initial transmission of the voice call header to join the on-going location-based talk group call by processing the embedded link control frame and unmuting for subsequent audio data in a same or similar manner to that set forth above.

FIG. 6 sets forth a method 600 executable at a receiving SU, such as SU 104 of FIG. 1, for automatically determining whether to participate in a location-based talk group call with reduced messaging overhead, in accordance with an embodiment. At step 602, the receiving SU receives a voice call header or embedded link control frame (perhaps from an initiating SU or DC, and perhaps using the voice call header 500 structure set forth in FIG. 5) indicating a request for a location-based talk group call (e.g., perhaps using an FLCO field 506 set to a value to indicate a location-based talk group call). Responsive to receiving the voice call header or embedded link control frame and determining that it indicates a location-based talk group call, at step 604 the receiving SU determines its current geographic location. The receiving SU may determine its own current geographic location via GPS, triangulation, or some other method.

At step 606, the receiving SU compares its own determined current geographic location with the geographic location represented by the location data in the voice call header. This step may involve the further processing of the location data from the voice call header, including but not limited to concatenation, decompression, or some other modification of the location data. At optional step 608, the receiving SU may also determine whether it meets the attributes requirements set forth in the voice call header by comparing its own preconfigured attributes to those attributes specified in the voice call header. For example, if the voice call header attributes are set to a value to indicate that only medical responders are to join the location-based talk group call, and the receiving SU is preconfigured with an attribute associated with a fire responder, the receiving SU may refrain from further processing of the voice call header and refrain from unmuting for any subsequently transmitted call data associated with the voice call header.

Assuming that the receiving SU meets the attribute requirements of optional step 608, or that optional step 608 is not executed, at step 610, the receiving SU determines whether its own current geographic location meets the location criterion of the call. In one embodiment, and as set forth in FIG. 5, the location criterion of the call may be specified in the voice call header itself in the form of a distance, radius, boundary condition, or some other location criterion. In another embodiment, the receiving SU may be preconfigured to apply a predetermined location criterion, such as a set distance, radius, or boundary condition. In any event, at step 610, the receiving SU determines whether the location criterion is met (e.g., it is within the boundaries defined by the voice call header or preconfigured at the receiving SU, based on the geographic reference location represented by the location data in the voice call header).

If the receiving SU does not meet the location criterion of the call, processing proceeds to step 612 where the receiving SU refrains from unmuting and playing back any subsequently transmitted call data associated with the voice call header. If, however, the receiving SU determines at step 610 that it does meet the criterion of the call, processing proceeds to step 614 where the receiving SU unmutes and plays back subsequently transmitted call data associated with the voice call header.

As set forth above, by using the location data in the voice call header as a pseudo-talk-group identifier, after the initiating SU (or DC) has stopped transmitting, and even after a call hang-time has passed, the receiving SU can subsequently reuse the location data from the originally transmitted voice call header (or embedded in an embedded link control frame) to start a new call to a new set of SUs that currently satisfy the location criterion of the originally transmitted voice call header, even though the receiving SU (which has now become a new initiating SU) may be nowhere near the location indicated in the originally transmitted voice call header. For example, at optional step 616, and responsive to a detected user input indicating a request to call back to the same location-based talk group, the receiving SU may broadcast a second voice call header specifying the same criteria (including one or more of the same location data, the same distance or boundary information, and the same attribute information) and specifying the same location-based talk group identifier field as the originally transmitted voice call header.

In some situations, a receiving SU that met the location criterion at step 610 may subsequently, due to the inherent mobility of the SU, no longer meet the location criterion of the location-based talk group call, but still wish to monitor and/or participate in future calls to the same location-based talk group. As set forth in optional step 618 of FIG. 6, a receiving SU may, responsive to a detected request to continue receiving subsequent calls made to the location-based talk group regardless of the current geographic location of the receiving SU (e.g., perhaps responsive to a user input made at an input interface of the SU indicating a desire to continue monitoring the location-based talk group via a menu selection), the receiving SU may temporarily or permanently disable the location criterion requirement (set forth in step 610) for future received calls made to the same location-based talk group that the receiving SU previously met the location criterion requirement for.

FIG. 7 sets forth a method 700 executable at a DC, such as DC 121 of FIG. 1, for automatically creating and participating in a location-based talk group call with reduced messaging overhead, in accordance with an embodiment.

At step 702, the DC detects a request for a location-based talk group call. The DC may detect the request via a dispatcher's selection of a "Create Location-Based Talk Group Call" menu selection displayed on a display (e.g., the display 305 of FIG. 3) of the DC or some similar menu option via a same or different input button, or in some other similar manner. In other embodiments, the DC detecting the request may comprise the DC receiving a request or instruction from a SU (such as SU 102 of FIG. 1) requesting that the DC start a location-based talk group call. In still a further embodiment, a dispatcher may use a login ID that is pre-associated with a particular designated geographic location, the login triggering creation of a corresponding location-based talk group associated with the designated geographic location. Other possibilities exist as well.

At step 704, and responsive to detecting the request for the location-based talk group call, the DC determines a geographic reference location to use for the location-based talk group call, and generates corresponding representative location data. The geographic reference location may be a determined current geographic location of a SU (e.g., a location determined by SU 102 in FIG. 1 and provided to the DC via BS 134 on its own or at the DC's request) selected by the DC, or via some other process. In another embodiment, the geographic reference location may be chosen as a geographic location of a BS (e.g., perhaps a BS 134 in FIG. 1) perhaps identified as serving the requesting SU. In still another embodiment, the geographic reference location may be an incident scene selected from a mapping application or database stored locally at the DC or stored remotely from the DC but accessible to the DC via a wireless or wired interface (e.g., incident scene 103 in FIG. 1).

The geographic reference location may be represented via an absolute latitudinal and longitudinal coordinate pair. In other embodiments, Cartesian or polar coordinate systems could be used instead. Because the geographic reference location will be transmitted over-the-air and used as a pseudo-talk-group identifier, the location data representing the geographic reference location may have to be compressed or concatenated in a same or similar manner to that set forth above with respect to the SU-initiated call.

At step 706, the DC generates a voice call header (or other type of header as set forth above) including the representative location data and a location-based talk group identifier field. At optional step 708, the DC may also determine a location criterion relative to the geographic reference location that will be used to limit the number of responding SUs joining the call. For example, the DC may be previously configured, or configured by a dispatcher on a call-by-call basis, to set a distance from the geographic reference location of 0.5 miles, 1 mile, 2 miles, or 5 miles. The location criterion may be included within the voice call header and used by receiving SUs in determining whether to join the group call and unmute for subsequently received call data associated with the voice call header. In other embodiments, the DC may not include a location criterion in the voice call header, and instead may rely on some preconfigured location criterion such as distance or boundary value(s) configured in the receiving SUs to determine whether they are sufficiently close to the geographic reference location to join the location-based talk group call. Of course, other methods of defining boundaries than specifying distance may be used, as set forth above. Also at optional step 708, the DC may define one or more attributes that function to further limit the field of SUs receiving the voice call header and joining the talk group call, in a same or similar manner to that set forth above. For example, the DC may use a same or similar voice call header to that disclosed above with respect to FIG. 5.

At step 709, the DC may identify one or more BSs determined to provide coverage within the area defined by the geographic reference location and the specified or pre-configured location criterion associated with the location-based talk group call. For example, and with reference to FIG. 1, if the DC identifies a geographic reference location substantially at the incident scene 103, and a desired distance radius substantially equal to D3, the DC may access a local or remote coverage database and determine that BS 134 provides sufficient coverage to cover some threshold percentage (such as 70%, 90%, or 99%) of the defined location-based talk group call area. Accordingly, the DC may identify the BS 134 as the only BS that needs to broadcast the generated voice call header and only provide the voice call header to that identified BS.

In another example, if the DC identifies the same geographic reference location substantially at the incident scene 103, but instead decides on or is preconfigured with a desired distance radius substantially equal to D4, the DC may access the local or remote coverage database and determine that BSs 134-146 are necessary to provide sufficient coverage to cover the same threshold percentage of the defined location-based talk group call area. Accordingly, the DC may identify the BSs 134-146 as the BSs that need to broadcast the generated voice call header and only provide the voice call header to those identified BSs.

At step 710, the DC causes the BSs identified in step 709 to broadcast the generated voice call header, including the representative location data, the location-based talk group identifier field, and any other fields generated at steps 706 and/or 708. At step 712, and without having to wait for SUs receiving the voice call header to affirmatively respond and join the new and dynamically created location-based talk group call, the DC subsequently begins to broadcast call data associated with the voice call header. Accordingly, the transmitting DC leaves it up to receiving SUs to determine whether to unmute for the subsequently transmitted call data, and does not arbitrate or otherwise affirmatively accept or reject receiving SU participation in the location-based talk group call (for example, IDs and location information of receiving SUs are not provided to the DC in relation to the location-based talk group call), resulting in decreased messaging overhead in creating location-based talk group calls, improved start-up times in creating location-based talk group calls, and less chance for errors due to manual dispatcher configuring.

At optional step 714, the DC may also periodically embed the representative location data and a same or similar location-based talk group identifier field in an embedded link control frame embedded within the call data to allow late-arriving SUs that perhaps missed the initial transmission of the voice call header to join the on-going location-based talk group call.

III. CONCLUSION

In accordance with the foregoing, an automatic location-based talk group call method and devices are disclosed that allows for automatic creation of location-based talk group calls with reduced messaging overhead and manual dispatcher involvement, and for SUs to process and selectively join such location-based talk group calls, which alleviate or overcome the disadvantages of the prior art. As a result, a more efficient, robust, and adaptable communications system can be provided at a varying number and type of incidents, improving response times and communication capabilities of incidence response groups. Furthermore, by partitioning the RF space by geography, it may become possible to allow more users to share a single frequency. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terMS "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and wherein the location data representative of the geographic reference location is GPS location data, and wherein the location data representative of the geographic reference location is compressed location data generated by removing one or more most significant bits of a GPS-determined latitude location of the first subscriber unit and one or more most significant bits of a GPS-determined longitude location of the first subscriber unit.

2. The method of claim 1, wherein the location criterion is fully determined by the first subscriber unit and is specified in the call header.

3. The method of claim 2, wherein the location criterion includes a specified radius that extends from the geographic reference location represented by the location data included in the call header.

4. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header; and subsequently transmitting the data associated with the call header; and receiving the call header at a second one of the plurality of subscriber units;

determining, from the value in the location-based talk group filed, that the call is a location-based talk group call;

determining, by the second subscriber unit, its current geographic location;

comparing, by the second subscriber unit, its determined current geographic location with the geographic location represented by the location data in the call header; and responsive to determining, by the second subscriber unit, that the second subscriber unit's current geographic location is within a predetermined distance, also identified in the call header, from the geographic location represented by the location data in the call header, the second subscriber unit outputting data received in subsequent data associated with the call header; and further comprising, at the second subscriber unit and after the first subscriber unit has stopped transmitting the subsequent data:

responsive to detecting, via the second subscriber unit, an input requesting a call back to the same location-based talk group:

broadcasting, by the second subscriber unit, a second location-based talk group call header including the location data, different from the current geographic location of the second subscriber unit, and including the location-based talk group call identifier field set to a value that causes other subscriber units in the plurality receiving the second call header to receive and output second subsequent data associated with the second call header responsive to each of the other subscriber units determining that its current geographic location satisfies the location criterion of the call that is at least partly defined by the location data included in the second location-based talk group call header; and subsequently transmitting, by the second subscriber unit, the second data associated with the second call header.

5. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and the first subscriber unit determining a type of responder for joining the location-based talk group, and the first subscriber unit setting an attribute field in the call header indicative of the type of responder;

the second subscriber unit determining whether it meets the type of responder criteria set forth in the call header; and responsive to determining, by the second subscriber unit, that the second subscriber unit meets the type of responder criteria and that the second subscriber unit's current geographic location satisfies the location criterion of the call that is at least partly defined by the location data included in the second location-based talk group call header, the second subscriber unit outputting data received in subsequent data associated with the call header; and wherein the second subscriber unit broadcasting the second location-based talk group call header further comprises setting a second attribute field in the second call header equal to the attribute field received in the call header.

6. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and wherein the location data in the call header functions as a reusable talk group identifier allowing any one of the plurality of subscriber units to use the same location data in a similar second call header to communicate further with subscriber units that satisfy the location criterion of the call that is at least partly defined by the location data included in the location-based talk group call header.

7. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and periodically embedding the location data and location-based talk group call identifier field into the subsequently transmitted data so as to allow late-arriving subscriber units that missed the call header to subsequently join the location-based talk group call once they satisfy the location criterion of the call that is at least partly defined by the location data embedded in the call data.

8. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and determining, by the first subscriber unit, a type of responder for joining the location-based talk group, and the first subscriber unit setting an attribute field in the call header indicative of the type of responder so as to cause only those other subscriber units that meet the type of responder criteria and that satisfy the location criterion of the call that is at least partly defined by the location data included in the second location-based talk group call header to receive and output subsequent data associated with the call header.

9. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and wherein the location-based talk group call is established without transmitting or receiving any other call setup or group establishment messages at any one or more of the plurality of subscriber units.

10. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and wherein the location-based talk group call is established without the first subscriber unit receiving location data or subscriber unit identifier information from any other participants in the location-based talk group call during the call setup process.

11. A method of automatic establishment of a location-based talk group call with reduced messaging overhead, in a wireless radio communication system comprising a plurality of subscriber units, the method comprising, responsive to detecting an input requesting that a new location-based talk group call be established:

determining, by a first one of the plurality of subscriber units, a geographic reference location and generating location data representative of the geographic reference location;

broadcasting, by the first subscriber unit, a location-based talk group call header including the location data and including a location-based talk group call identifier field set to a value that causes other subscriber units in the plurality receiving the call header to receive and output subsequent data associated with the call header responsive to each of the other subscriber units determining that its current geographic location satisfies the location criterion of the call that is at least partly defined by the location data included in the call header;

subsequently transmitting the data associated with the call header; and wherein the data associated with the call header is one of voice, video, and text data, and outputting the data associated with the call header comprises one of playing back voice data via a speaker, displaying video via a display, and displaying text data via the display.

12. A wireless subscriber unit comprising:
a memory;
a transceiver; and
a processor configured to:
- receive, via the transceiver, a first location-based talk group call header including location data and including a location-based talk group call identifier field set to a value;
- determine a current geographic location of the wireless subscriber unit;
- determine whether the current geographic location satisfies the location criterion of the call that is at least partly defined by the location data included in the call header; and
- if it is determined that the current geographic location does satisfy the location criterion of the call, processing and outputting subsequent data, received via the transceiver, associated with the call header;

wherein the processor is further configured to:
- responsive to a detected input request to continue receiving subsequent location-based talk group calls made to the same location-based talk group as the first location-based talk group call, despite the subscriber unit no longer meeting the location criterion of the first location-based talk group call, refraining from enforcing the location criterion requirement for subsequent location-based talk group calls made to the same location-based talk group as the first location-based talk group call.

* * * * *